US012567952B2

(12) United States Patent
Mugunda et al.

(10) Patent No.: US 12,567,952 B2
(45) Date of Patent: Mar. 3, 2026

(54) SYSTEM AND METHOD FOR MANAGING DATA PROCESSING SYSTEMS AND HOSTED DEVICES

(71) Applicant: Dell Products L.P., Round Rock, TX (US)

(72) Inventors: Chandrasekhar Mugunda, Austin, TX (US); Rui An, Austin, TX (US); Akshata Sheshagiri Naik, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 236 days.

(21) Appl. No.: 18/496,030

(22) Filed: Oct. 27, 2023

(65) Prior Publication Data

US 2025/0141663 A1 May 1, 2025

(51) Int. Cl.
*H04L 9/08* (2006.01)
*H04L 9/32* (2006.01)
(52) U.S. Cl.
CPC .......... *H04L 9/0825* (2013.01); *H04L 9/3228* (2013.01)

(58) Field of Classification Search
None
See application file for complete search history.

(56) References Cited

U.S. PATENT DOCUMENTS

| | | |
|---|---|---|
| 2016/0103673 A1 | 4/2016 | Curran |
| 2019/0370778 A1* | 12/2019 | Lerch ................. G06Q 20/3227 |
| 2020/0334025 A1 | 10/2020 | Wang |
| 2021/0034350 A1 | 2/2021 | Chen |
| 2021/0117548 A1 | 4/2021 | Gokhman |
| 2021/0334378 A1* | 10/2021 | Kennedy ............... H04L 9/3247 |
| 2022/0398105 A1 | 12/2022 | Lambert |

* cited by examiner

*Primary Examiner* — William J. Goodchild
(74) *Attorney, Agent, or Firm* — WOMBLE BOND DICKINSON (US) LLP

(57) ABSTRACT

Methods and systems for managing operation of data processing systems are disclosed. To manage operation of the data processing systems, the data processing systems may present a communication and credential management system. The communication and credential management system may be used to manage the operation of any number of devices hosted by the data processing systems. The communication and credential management system may include a device provisioning, validity, and removal process.

20 Claims, 8 Drawing Sheets

SYSTEM AND METHOD FOR MANAGING DATA PROCESSING SYSTEMS AND HOSTED DEVICES

FIELD

Embodiments disclosed herein relate generally to device management. More particularly, embodiments disclosed herein relate to systems and methods to manage the operation of data processing systems in a distributed system.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems. More specifically, to managing operation of hardware resources installed within the data processing systems.

Figure 5:
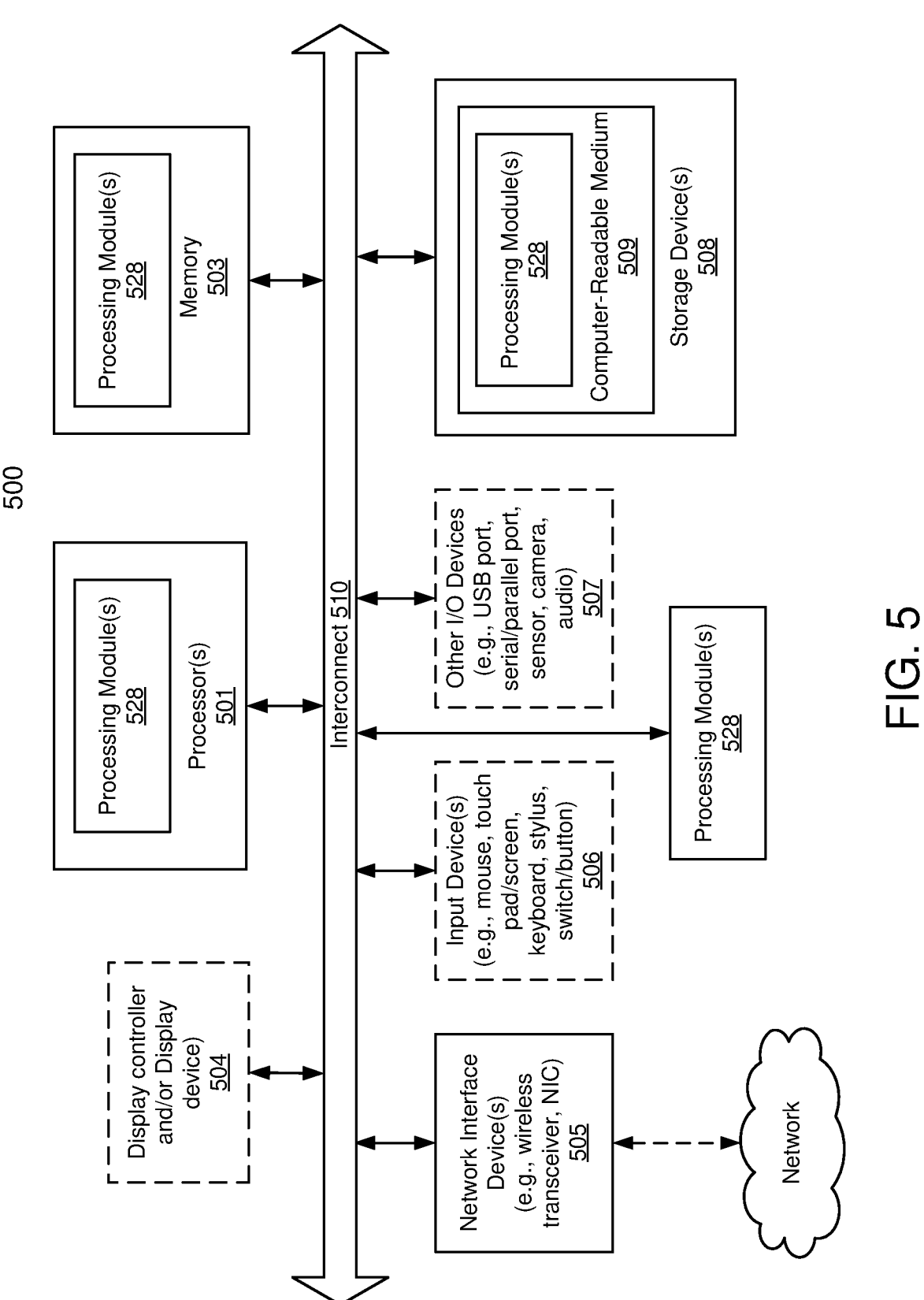
FIG. 5 shows a block diagram illustrating a data processing system in accordance with an embodiment.

To provide computer implemented services, data processing systems may include default hardware resources (e.g., a processor, memory, and other hardware components as described in more detail below in reference to FIG. 5). Additional hardware resources (e.g., additional graphic processing units (GPU), network interface cards (NICs), etc.) (referred to herein as "management controller enhanced devices (MCEDs)) may be installed in the data processing systems to further enhance the data processing systems' abilities to provide better (e.g., faster, more efficient, etc.), more reliable computer implemented services.

However, these MCEDs may host their own management and processing resources (e.g., hardware management consoles (HMC), baseboard management controller (BMC), etc.) that provide advanced management, serviceability, debuggability, and other services of these additional hardware resources. As a result, these MCEDs require management (e.g., initial provisioning, credential validation, internal and external communications, implementing security policies, device removal and/or replacement, etc.) by existing hardware resources (e.g., a host BMC) of the data processing systems on which these MCEDs are installed.

To improve security (e.g., preventing snooping attacks), enhance communication (e.g., between the MCEDs and external devices and/or the data processing system), and improve portability of the MCEDs between different data processing systems, the data processing systems may present a communication and credential management system through which MCEDs hosted by the data processing system may be managed.

The communication and credential management system may do so by ensuring a secure communication scheme between the existing hardware resources (namely, the host BMC) of the data processing systems and the MCEDs (e.g., to prevent snooping attacks on the MCEDs by external devices), and by ensuring that each MCED is returned to a default configuration before being removed from a specific data processing system.

By doing so, any number of MCEDs may be managed by a data processing system using the communication and credential management system. Thus, embodiments disclosed herein may address, among others, the technical challenges of using data processing systems (namely, the host BMCs of the data processing systems) to more efficiently and securely manage MCEDs installed within the data processing systems.

In an embodiment, a method for managing management controller enhanced devices (MCEDs) of a data processing system is disclosed. The method may include: obtaining, by a guest processing complex of a MCED of the MCEDs, a secure encryption key (SEK) from the host management controller over a first communication channel; obtaining, by a guest management controller of the MCED and from the guest processing complex, the SEK; obtaining, by the guest management controller, a secured communication from the host management controller over a second communication channel; decrypting, by the guest management controller, the secured communication using the SEK to obtain a message; and performing, by guest management controller, at least one action based on the message.

The first communication channel is a secured communication channel and the second communication channel is an unsecured communication channel.

The first communication channel is implemented using an inter-integrated communication (I2C) communication link and the second communication channel is implemented using at least one item selected from a group of items consisting of: a universal serial bus (USB), a peripheral component interconnect express (PCIe) Bus, a serial ATA (SATA) bus, and a serial peripheral interface (SPI) bus.

The host management controller and the guest management controller are baseboard management controllers and the guest processing complex is a field programmable gate array (FPGA).

The method further includes: managing, by a credential manager of the host management controller, a provisioning, validity, and removal of the MCEDs from the data processing system, wherein the credential manager is coupled to a credential repository configured in the host management controller, and wherein the host management controller is separate and distinct from a processor of the data processing system.

Managing the provisioning, validity, and removal of the MCEDs comprises: generating a password for the MCED in response to determining that the MCED is being provisioned in the data processing system; setting a password validity duration for the password; and storing the password and information specifying the password validity duration in the credential repository. The message comprises the password.

Managing the provisioning, validity, and removal of the MCEDs further comprises: making a first determination that the password validity duration of the password has expired; in response to the first determination, generating a new password and setting a new password validity duration for the MCED; and updating the credential repository with the new password and the new password validity duration.

Managing the provisioning, validity, and removal of the MCEDs further comprises: making a second determination that the MCED is being removed from the data processing system; and in response to the second determination, causing execution of one or more MCED removal policy actions to facilitate graceful removal of the MCED from the data processing system.

The one or more MCED removal policy actions comprise: generating MCED removal instructions to cause the MCED to reset to default device configurations before being physically or operably removed from the data processing system; and deleting the password and the information specifying the password validity duration from the credential repository to place the MCCED in a state conducive to provisioning with another data processing system.

The one or more MCED removal policy actions further comprise: transmitting the MCED removal instructions to the guest processing complex via a second secured communication over the second communication channel, wherein the guest processing complex decrypts the second secured communication using the SEK stored in the guest management controller.

In an embodiment, a non-transitory media is provided. The non-transitory media may include instructions that when executed by a processor cause the computer-implemented method to be performed.

In an embodiment, a data processing system is provided. The data processing system may include the non-transitory media, the host management controller, the MCED, and a processor, and may perform the computer-implemented method when the computer instructions are executed by the processor.

Figure 1:
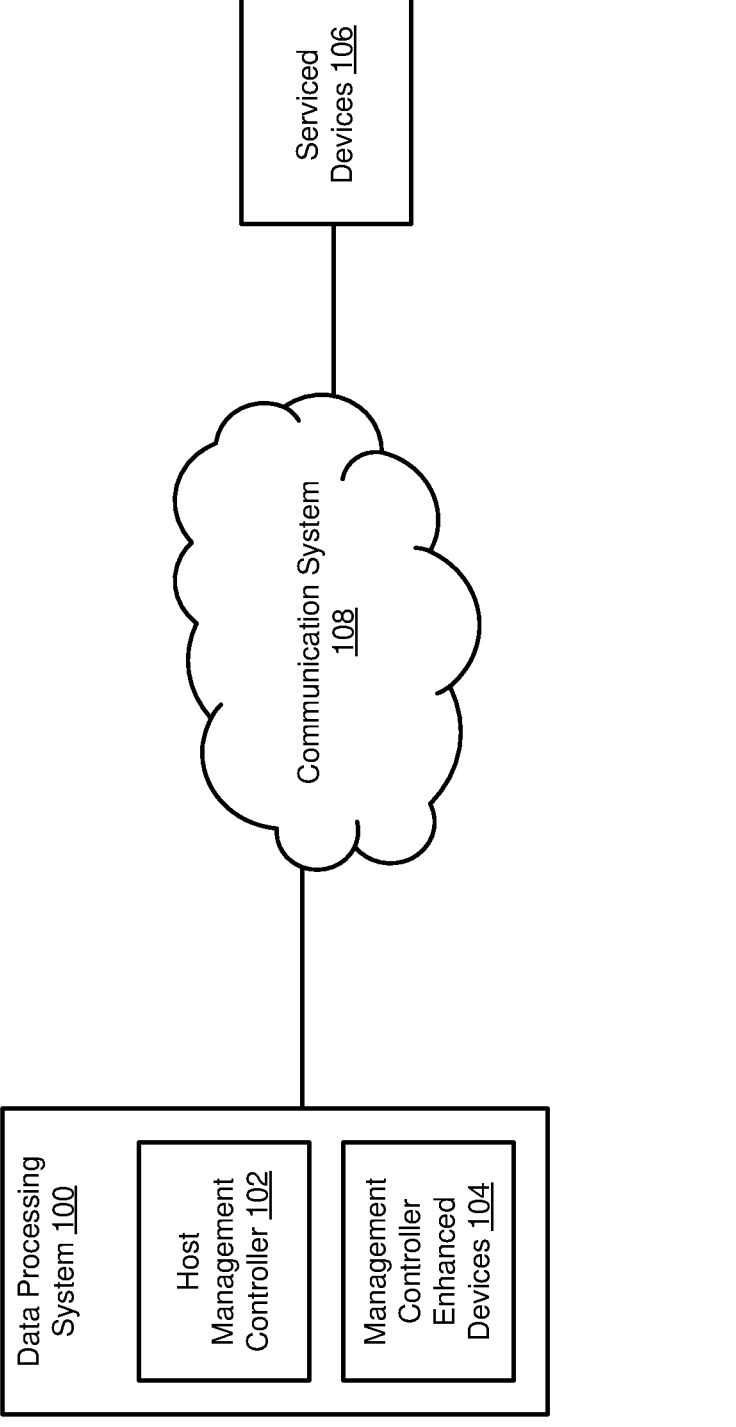
FIG. 1 shows a block diagram illustrating a system in accordance with an embodiment.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other types of service that may be implemented with a computing device.

To provide the computer-implemented services, the system may include any number of data processing system 100. Data processing system 100 may provide all, or a portion, of the computer implemented services to users of data processing system 100 and/or to other devices (not shown), and/or may cooperate with other devices that provide the computer implemented services. Different data processing systems may provide similar and/or different computer implemented services.

For example, of data processing system 100 may be members of cloud environments that provide the computer implemented services. The cloud environments may include any number of devices that provide computer implemented services.

To provide the computer-implemented services, data processing system 100 may include various hardware components (e.g., processors, memory modules, storage devices, etc.) and host various software components (e.g., operating systems, application, startup managers such as basic input-output systems, etc.). These hardware and software components may provide the computer-implemented services via their operation.

To provide one or more of the computer-implemented services, the hardware and/or software components may need to operate in predetermined manners. If the hardware and/or software components do not operate in the predetermined manners, then a data processing system may be unable to provide all, or a portion, of the computer-implemented services that it normally provides.

In general, embodiments disclosed herein may provide methods, systems, and/or devices for managing the operation of data processing system 100. To manage the operation of data processing system 100, management operations may be performed. The management operations may include (i) collect information regarding the operation of a data processing system, and/or components thereof, and (ii) modify the operation of the data processing system, and/or components hereof. By doing so, operation of data processing system 100 may be modified over time to improve the likelihood of data processing system 100 providing desired computer implemented services.

For example, the operation of data processing system 100 may be modified to (i) address undesired operation of any of its hardware or software components that if left unaddressed may negatively impact provided computer implemented services, (ii) improve efficiency of provided computer implemented services, (iii) modify the types of services provided, and/or for other reasons.

Data processing system 100 may include host management controller 102 (e.g., a BCM of the data processing system 100) and any number of management controller enhanced devices (MCEDs) 104. Each of these components is discussed below.

MCEDs 104 may contribute to the computer implemented services provided by data processing system 100. MCEDs may, for example, provide graphics processing services, network communication services, processing offload services, and/or other types of services. To provide these services MCEDs 104 may include any hardware components such as field programmable gate arrays, digital signal processors, application specific integrated circuits, etc.

In addition to contributing to the computer implemented services, MCEDs may track and provide information regarding the operation of their various hardware and software components to other entities. For example, the MCEDs may log information regarding power consumption, temperature, errors that have occurred, and/or other types of information regarding their operation.

Host management controller 102 may cooperatively and/or individually manage the operation of MCEDs 104. To do so, host management controller 102 may obtain information (e.g., credential information) regarding the operation of the MCEDs, and use the information to identify when to perform various management actions (e.g., update the credentials, remove or replace an MCED, re-provision an MCED, etc.). The management actions may cause the operation of the MCEDs and/or the data processing system 100 to update its operation.

Figure 2A:
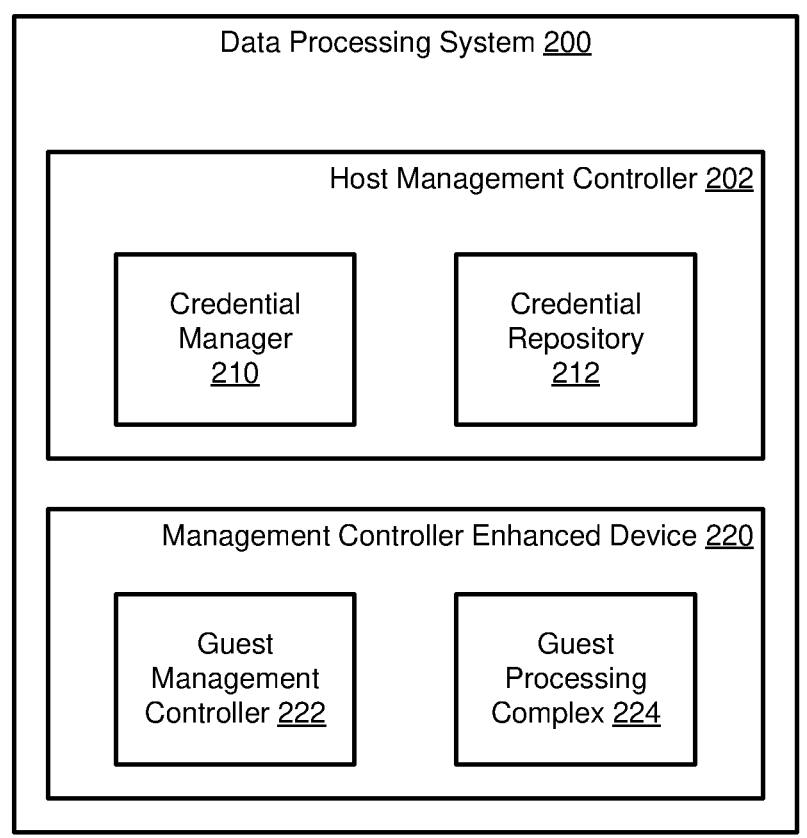
FIG. 2A shows a block diagram illustrating a data processing system in accordance with an embodiment.
Figure 2B:
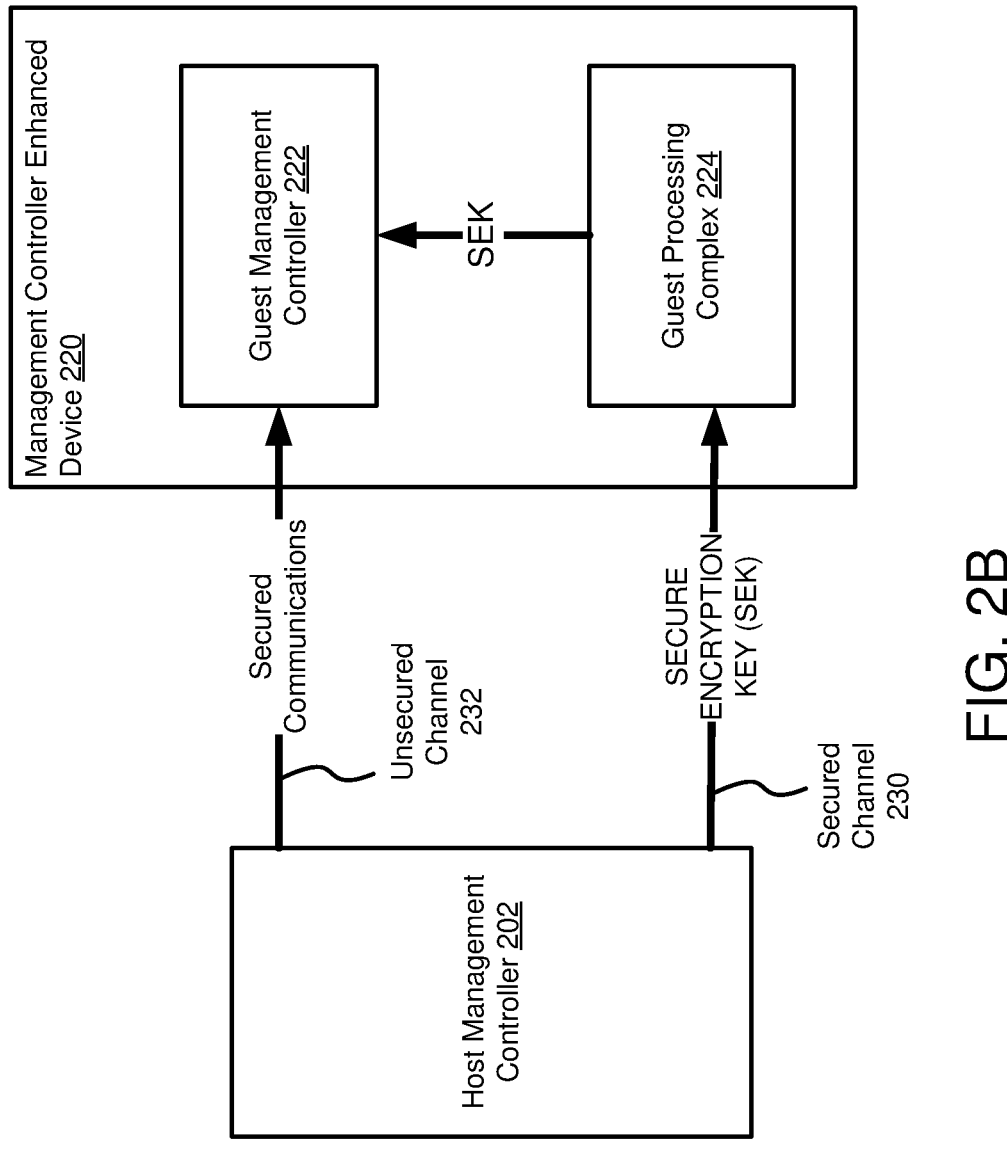
FIG. 2B shows a connectivity diagram for a data processing system in accordance with an embodiment.
Figure 2C:
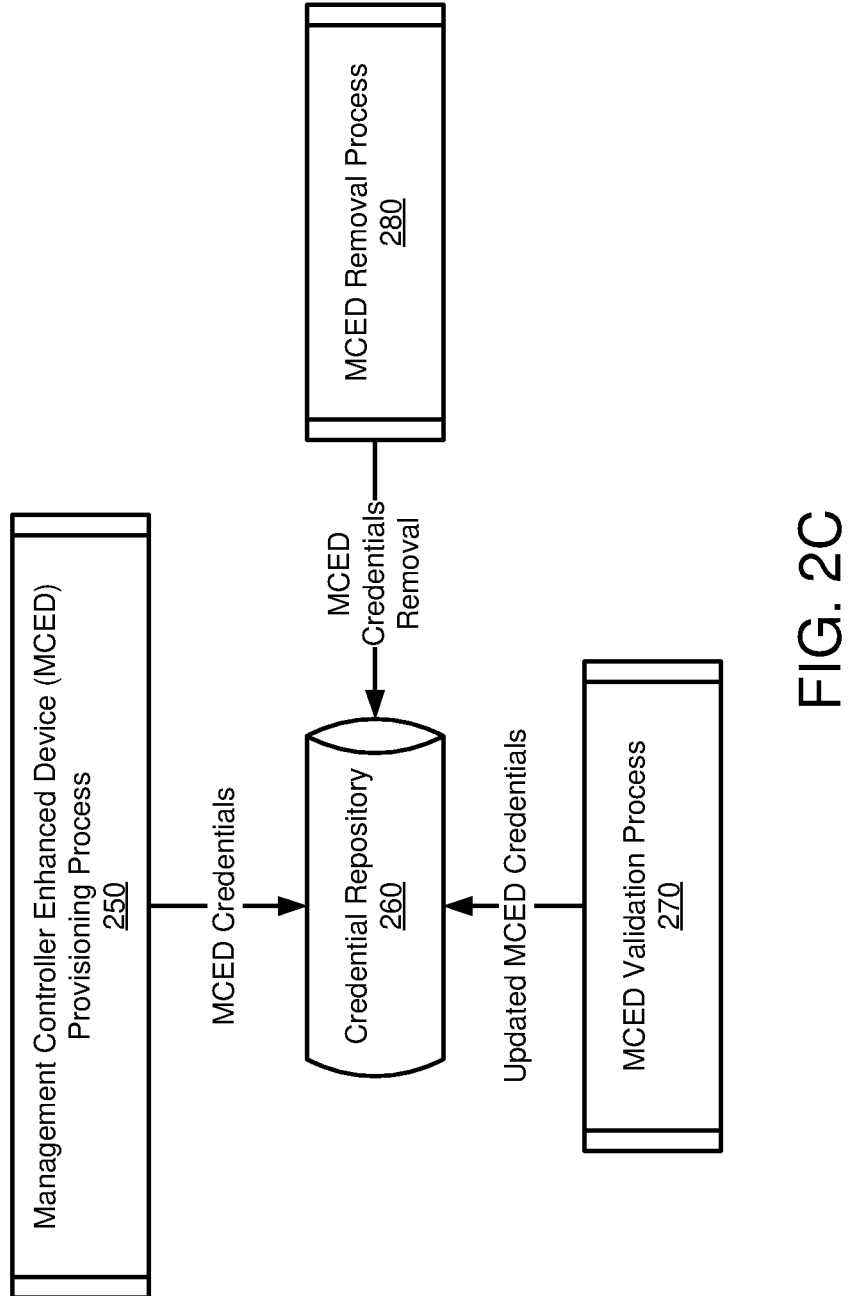
FIG. 2C shows a diagram illustrating data flows in accordance with an embodiment.

To securely manage operation of MCEDs 104, host management controller 102 may implement a system through which information (e.g., credentials and/or other forms of secure information) is securely communicated to the MCEDs 104 (without fear of the information being intercepted during communication by, e.g., a snooping attack). Additionally, to ensure portability of the MCEDs 104 between different processing systems (e.g., from an original data processing system to another data processing system that is agnostic of previous device settings and policies of the MCEDs and/or the original data processing system) and to ensure secure communication between MCEDs 104 and external devices (e.g., serviced devices 106), host management controller 102 may implement an MCED provisioning, validity, and removal process as part of the above-discussed communication and credential management system. Refer to FIGS. 2A-2C for additional details regarding secure transmission of communications between the management controller and the MCEDs 104 and the provisioning, validity, and removal of the MCEDs by the host management controller 102.

By doing so, host management controller 102 may be able to manage a larger number of MCEDs 104 more securely and effectively. For example, snooping attacks by external devices to steal the credentials of the MCEDs 104 (e.g., that is used by external devices to communicate with and issue commands to the MCEDs) can be prevented. Additionally, reusability of these MCEDs between different ones of the data processing systems with different device settings and policies may also be improved.

Serviced devices 106 may request one or more computer implemented services from the data processing system. For example, serviced devices 106 may be associated with one or more clients of an administrator/provider of the data processing system 100. Services devices may request one or more computer implemented services by communicating (e.g., communicating requests) with the MCEDs 104 through the host management controller 102 of the data processing system 100.

Figure 3A:
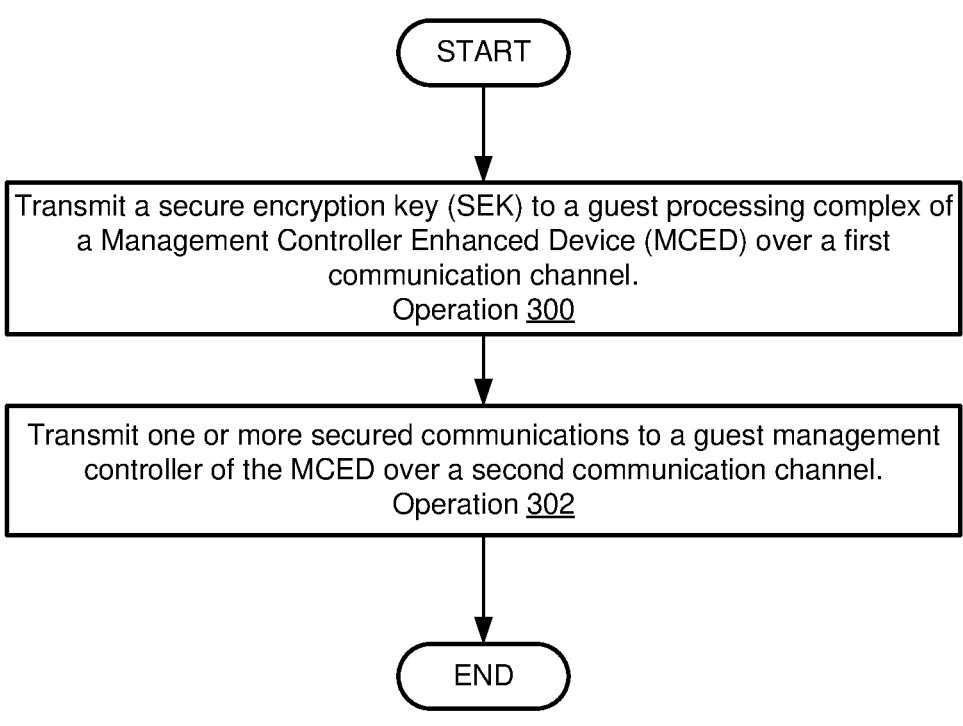
FIGS. 3A-3B show flow diagrams illustrating methods of managing operations of data processing systems in accordance with an embodiment.
Figure 3B:
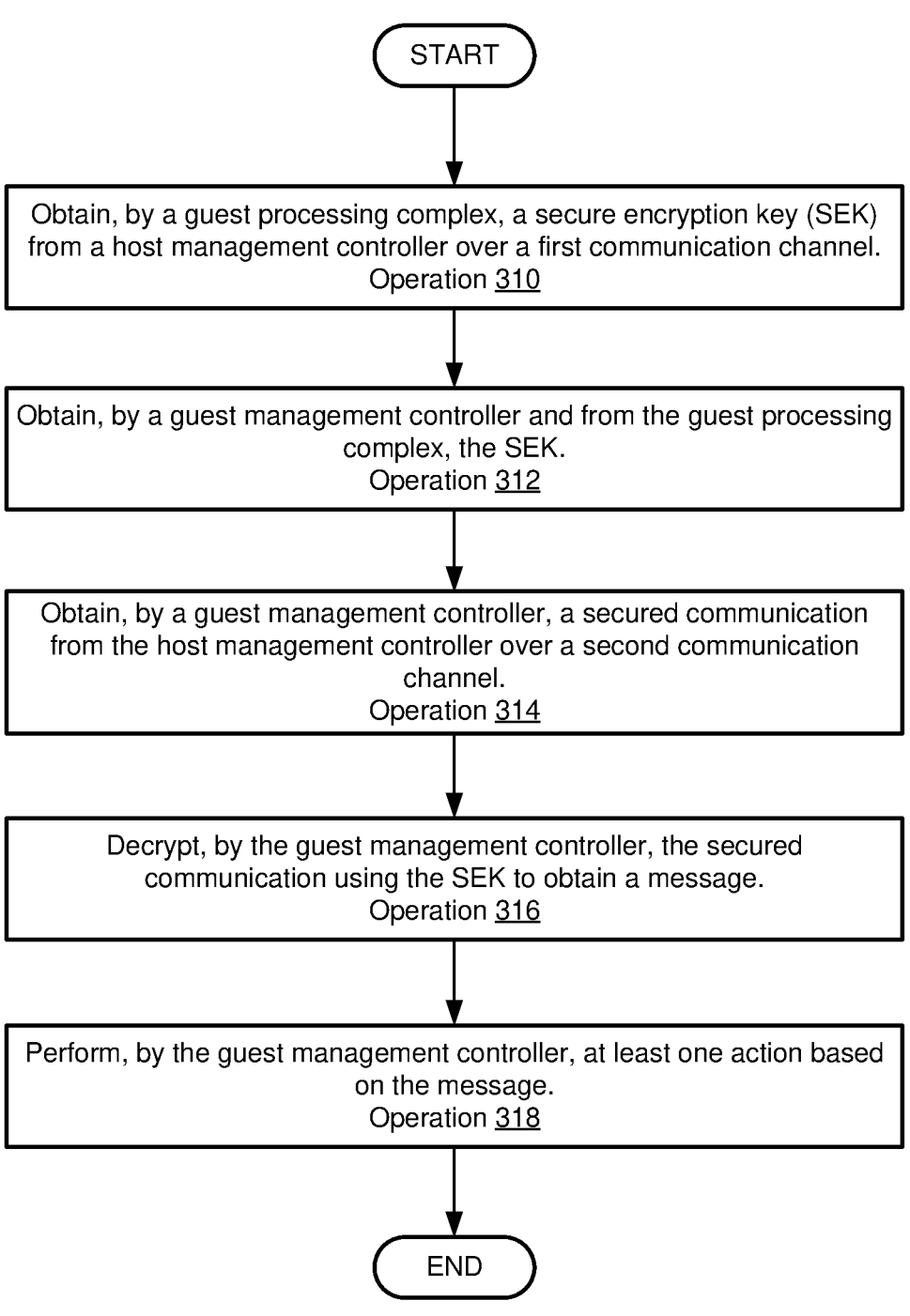
Figure 4:
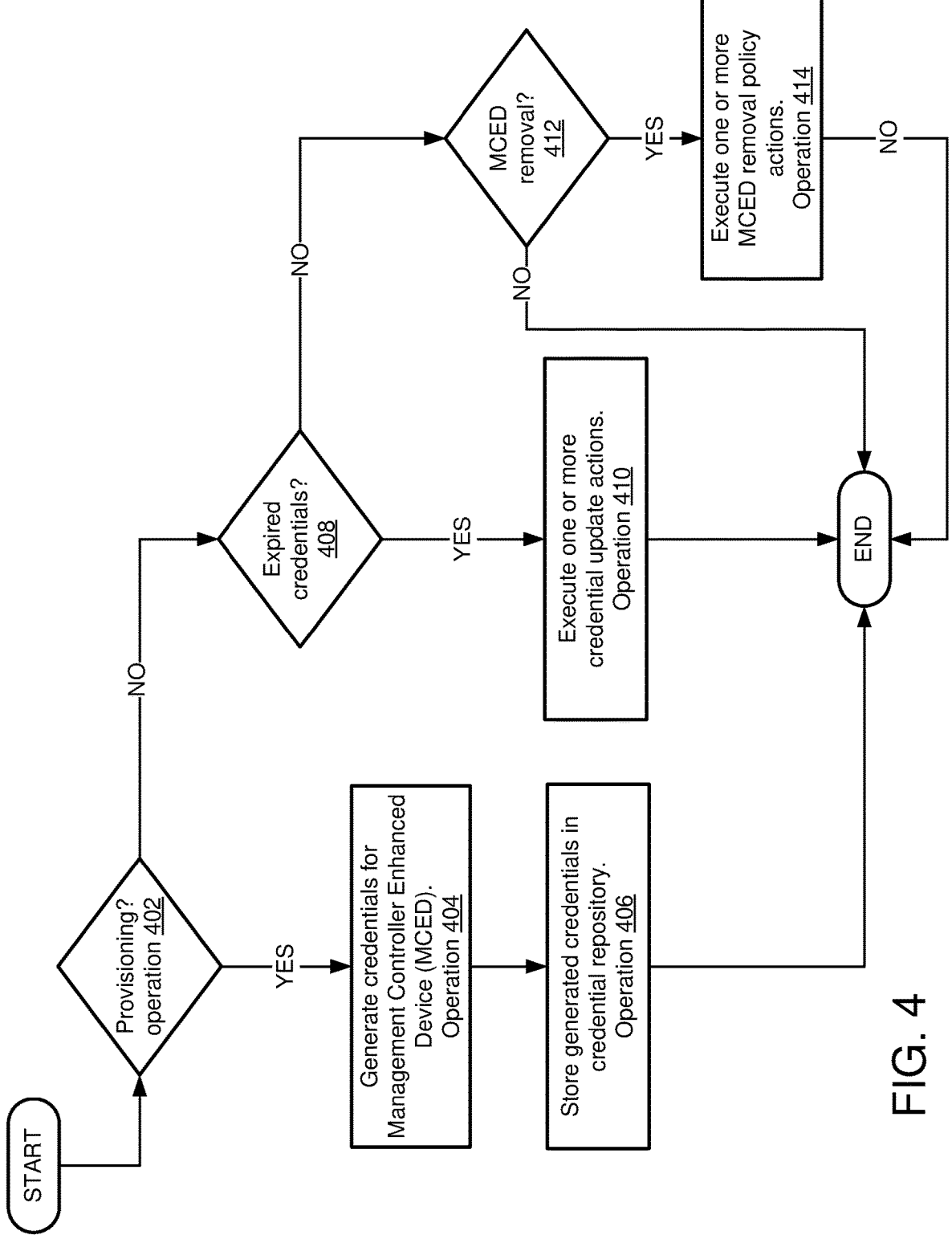
FIG. 4 shows a flow diagram illustrating methods of managing operations of data processing systems in accordance with an embodiment.

When providing their functionality, any of data processing system 100 and serviced devices 106 may perform all, or a portion, of the methods illustrated in FIGS. 3A-3B and 4.

Any of data processing systems 100 and/or serviced devices 106 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Serviced devices 106 may be implemented with multiple computing devices. The computing devices of serviced devices 106 may cooperatively perform processes for providing computer implemented services to, e.g., an end user (e.g., a client). The computing devices of serviced devices 106 may perform similar and/or different functions.

Any of the components illustrated in FIG. 1 may be operably connected to each other (and/or components not illustrated) with communication system 108. In an embodiment, communication system 108 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

To further clarify embodiments disclosed herein, a diagram illustrating components of a data processing system in accordance with an embodiment is shown in FIG. 2A, and diagrams illustrating a connectivity diagram for the data processing system and a data flow implemented by the data processing system over time in accordance with one or more embodiments are shown in FIGS. 2B-2C, respectively.

Turning to FIG. 2A, a diagram of data processing system 200 in accordance with an embodiment is shown. Data processing system 200 may be similar to any of data processing systems 100.

Data processing system 200 may include host management controller 202 (e.g., the host management controller 102 of FIG. 1) and MCED 220. MCED 220 may be similar to any of MCEDs 104. While illustrated as including one MCED 220, data processing system 200 may include any number of MCEDs 220 without departing from embodiments disclosed herein.

Although not shown in FIG. 2A, data processing system 200 may include other hardware components including a host logic (e.g., a host processor, a central processing unit (CPU)) of the data processing system 200. This host processor may be configured to run an operating system (OS) of the data processing system and is separate and distinct from the host management controller 202 that is implemented as a BCM. The host processor of the data processing system 200 may be connected to the host management controller 202 and may issue one or more commands to the host management controller 202 (e.g., to cause the host management controller 202 and the credential manager 210 of the host management controller 202 to perform the processes discussed below in reference to FIGS. 3A and 4).

Host management controller 202 may include a credential manager 210. The credential manager 210 may be implemented in hardware, software, or a combination of both using the hardware resources of the of the host management controller 202. The credential manager may provide an MCED provisioning, validity, and removal process of one or more embodiments (discussed below in more detail below in reference to FIG. 4).

The host management controller 202 further includes a credential repository 212. Similar to the credential manager, the credential repository may be implemented in hardware, software, or a combination of both using the hardware resources of the of the host management controller 202 and may be implemented using any structure (e.g., a database, a list, etc.). The credential repository 212 may be configured to store credentials (e.g., an identifier ID, a password, a password validity duration, and other settings and/or configuration information) for each MCED 220 installed in the data processing system 200. Refer to FIG. 2C for a more detailed discussion of the ID, password, and password validity duration of an MCED 220.

MCED 220 may include hardware components including guest management controller 222 and guest processing complex 224 that perform various functions. Guest management controller 222 and guest processing complex 224 may collectively manage the operation of MCED 220 through, for example, collection of operation data, communication with management entities such as management controller 102, etc. Guest management controller 222 may be a BCM of the MCED 220. Guest processing complex 224 may be implemented using, for example, a field programmable gate array (FPGA) and or other similar hardware components.

Management controller 102 may manage the operation of MCED 220 through the guest management controller 222. To do so, management controller 102 may transmit communications including one or more instructions (e.g., instructions for the guest management controller 222 to: store credentials of the MCED 220 provisioned by the management controller 102, provide computer implemented services, communicate with external devices, etc.), and initiate management operation which may modify the operation of the MCED 220.

Additionally, although not shown in FIG. 2B, the MCED 220 may include a central processing unit (CPU) (e.g., a processor) coupled to memory (e.g., random access memory (RAM)). The CPU of the MCED 220 may be configured to run and control the operations and functions of the MCED 220 including the operations and functions of the guest management controller 222 and the guest processing complex 224. For example, the CPU of the MCED 222 may cause the guest management controller 222 and the guest processing complex 224 to perform the process discussed below in reference to FIG. 3B. The CPU of the MCED 220 may be a separate and distinct physical component from the guest management controller 222 and the guest processing complex 224.

Turning now to FIG. 2B, FIG. 2B shows a connectivity diagram for the data processing system. As shown in FIG. 2B, the host management controller 202 of the data processing system 200 communicates with the MCED 220 via two different channels including a secured channel 230 and an unsecured channel 232. Unsecured channel 232 may be implemented (as a fast untrusted path) using, for example, a universal serial bus compliant communication channel such as a universal serial bus (USB) cable. Unsecured channel 232 may also be implemented using other forms of communication/data buses such as, but not limited to: a peripheral component interconnect express (PCIe) Bus, a serial ATA (SATA) bus, a serial peripheral interface (SPI) bus, etc. On the other hand, secured channel 230 may be implemented (as a slow trusted path) using a data bus such as an inter-integrated circuit (I2C) communication link.

As further shown in FIG. 2B, to ensure secured communication between the host management controller 202 and MCED 220 (e.g., to prevent snooping attacks on information being communicated between the two components) the host management controller 202 transmits a secure encryption key (SEK) to the guest processing complex 224 of the MCED 220 via the secured channel 230. The SEK may be of any size and length and generated using any type of encryption protocol.

The MCED 220 then uses the SEK received from the host management controller 202 to decrypt one or more secured communications transmitted from the host management controller 202 via the unsecured channel 232 to the guest management controller 222. In particular, the SEK is provided to the guest management controller 222 by the guest processing complex 224. Such sending of the SEK via the secured channel 230 instead of the unsecured channel 232 ensures that that the SEK cannot be retrieved by external entities through a snooping attack on the data processing system 200. Therefore, even if the secured communications were to be stolen via a snooping attack, the entity that stole the secured communications would not be able to decrypt the secured communications without the SEK.

The secured communications transmitted from the host management controller 202 may include one or more messages. Each of the messages may include instructions for the MCED 220 to perform one or more actions (e.g., for the MCED 220 to provide computer implemented services, for the MCED 220 to configure/re-configure its operation, for the MCED 220 to store credentials provisioned by the host management controller 202 for the MCED 220, etc.).

Turning now to FIG. 2C, FIG. 2C shows a data flow implemented by the data processing system over time in accordance with one or more embodiments. More specifically, FIG. 2C illustrates data used in and data processing performed in an MCED provisioning, validity, and removal process (e.g., operations) performed by the host management controller 202. In this diagram, flows of data and processing of data are illustrated using different sets of shapes. A first set of shapes (e.g., cylinders, tubes, etc.) is used to represent data structures such as data bases and a second set of shapes (e.g., rectangles, etc.) is used to represent processes performed using and/or that generate data.

To improve portability of the MCEDs 220 between different data processing systems 200, MCED provisioning process 250, MCED validation process 270, and MCED removal process 280 may be performed.

During the MCED provisioning process 250, the host management controller 202 generates credentials for a new MCED to be added to (e.g., installed in) the data processing system 200. The credentials of an MCED 220 may include at least an identifier ID, a password, a password validity duration, and/or other settings and/or configuration information of the MCED 220 being provisioned. Provisioning of the MCED 220 by the host management controller 202 may include, for example, setting (or changing) a password for the MCED 220, setting communication protocols for the MCED 220 to communicate with the host management controller 202 (or other external devices such as serviced devices 106 of FIG. 1), etc. Provisioning the MCED 220 may be performed when the MCED 220 is added to (e.g., installed in) data processing system 200, when the data processing system 200 is first powered on, and/or based on one or more other conditions set by an administrator of the data processing system 200.

The ID of the MCED 220 may include a name (e.g., a manufacturer-set name, an administrator-set name, etc.) of the MCED 220. The password may be a string of bits representing a secret word, phase, and/or combination of characters that is required for communication with the MCED 220 (e.g., communication with the MCED 220 by external devices such as serviced device 106 of FIG. 1). The password validity duration may be an amount of time that specifies how long the password will be valid before the password expires and a new password will be required. Once generated, the MCED credentials may be stored in credential repository 260. Credential repository 260 may be similar to credential repository 212 discussed above in reference to FIG. 2B.

During the MCED validation process 270, the credential repository 260 is checked (e.g., by the host management controller 202) to determine whether any of the MCED credentials have expired and needs to be renewed. An MCED credential expires when the password validity duration generated for an MCED expires, resulting in the current password generated for (associated with) the MCED to become no longer valid. When an expired credential is detected, the host management controller 202 generates (via credential manager 210) updated MCED credentials for the MCED associated with the expired credentials. The updated MCED credentials include a new password and a new password validity duration for the MCED. Once generated, the updated MCED credentials are stored in the credential repository 260 and the corresponding expired credentials are removed (e.g., deleted) from the credential repository. The MCED validation process may be performed by the host management controller 202 at any time interval set by an administrator (e.g., authorized user) of the data processing system 200.

Finally, during the MCED removal process 280, the host management controller 202 (namely, credential manager 210 of the host controller 202) may determine that an MCED is to be removed (e.g., the host management controller 202 receives instructions from the host processor of the data processing system to gracefully remove an MCED from the data processing system) and/or replaced with a new MCED. Such MCED removal process 280 may be implemented when MCEDs 220 are being migrated between different data processing systems 200. Before an MCED 220 is removed from a data processing system 200, the MCED 220 must be instructed (e.g., by the host management controller 202 as part of the MCED removal process 280) to reset to its default settings and/or configurations as part of performing a graceful shutdown. As part of removing the MCED 220, the MCED removal process 280 also includes the removal of the MCED credentials (of the MCED being removed) from the credential repository 260.

Additionally, the MCED removal process 280 also includes a process to be executed/performed on an MCED 220 when an MCED 220 is being plugged into (e.g., installed in) a data processing system 200 for the first time. The process involves mandating the MCED 220 (via instructions transmitted from the host management controller 202 to the MCED 220) that is being plugged in for the first time to execute a reset to default settings and/or configurations. This ensures that previous settings and/or configurations associated with a different data processing system that the MCED 220 may have been previously installed in are fully erased from (e.g., removed/deleted from) the MCED 220.

Any of the processes illustrated using the second set of shapes may be performed, in part or whole, by digital processors (e.g., central processors, processor cores, etc.)

that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Turning to FIG. 3A, a flow diagram illustrating a method of managing data processing systems in accordance with an embodiment is shown. The method may be performed by data processing systems 100, host management controller 102, and/or other components of the system shown in FIG. 1 (and equivalent components described in FIG. 2A).

At operation 300, a secure encryption key (SEK) is transmitted to a guest processing complex of an MCED over a first communication channel. The SEK may be transmitted to the guest processing complex of the MCED from a host management controller of the data processing system. The first communication channel may be a secured channel (e.g., a slow trusted path) implemented using a data bus such as an inter-integrated circuit (I2C) communication link.

At operation 302, a secured communication (or multiple secured communications) is transmitted to a guest management controller of the MCED over a second communication channel. The secured communication may include a message from the host management controller to the guest management controller. The message may include instructions for the guest management controller to perform one or more actions (e.g., provide computer implemented services, configure/re-configure settings and operations of the MCED, store MCED credentials provisioned by the host management controller for the MCED, etc.). The message may also include the password (of the MCED credentials) as part of the instructions.

The second communication channel may be different from the first communication channel. In particular, the second communication channel may be an unsecured channel (e.g., a fast untrusted path) implemented using a universal serial bus compliant communication channel such as a universal serial bus (USB) cable. The second communication channel may also be implemented using other forms of communication/data buses such as, but not limited to: a peripheral component interconnect express (PCIe) Bus, a serial ATA (SATA) bus, a serial peripheral interface (SPI) bus, etc.

The method may end following operation 302.

Turning to FIG. 3B, a flow diagram illustrating a method of managing data processing systems in accordance with an embodiment is shown. The method may be performed by data processing systems 100, MCED 104, guest management controller 222, guest management processing complex 224, and/or other components of the system shown in FIGS. 1 and 2A-2C. The method of FIG. 3B may be performed in conjunction with the method of FIG. 3A.

At operation 310, an SEK is obtained by a guest processing complex of the MCED from a host management controller over a first communication channel (e.g., see operation 300 of FIG. 3A).

At operation 312, the guest management controller obtains the SEK from the guest processing complex. For example, the guest processing complex may transmit the SEK to the guest management controller over an internal bus (or wire(s)) that connects the two components to one another within the MCED.

At operation 314, a secured communication is obtained by the guest management controller from the host management controller over a second communication channel (e.g., see operation 302 of FIG. 3A).

At operation 316, the secured communication is decrypted by the guest management controller using the SEK to obtain a message. As discussed above, the message may include instructions for the guest management controller to perform one or more actions (e.g., provide computer implemented services, configure/re-configure settings and operations of the MCED, store MCED credentials provisioned by the host management controller for the MCED, etc.). The message may also include the password (of the MCED credentials) as part of the instructions.

At operation 318, at least one action based on the message is performed by the guest management controller. For example, if the message includes instructions for the guest management controller to store (or update) a password for the MCED, the guest management controller will store the password for the MCED in a storage of the MCED.

The method may end following operation 318.

Turning to FIG. 4, FIG. 4 shows a flow diagram illustrating a method of managing data processing systems in accordance with an embodiment is shown. The method may be performed by data processing systems 100, host management controller 102, credential manager 210, and/or other components of the system shown in FIGS. 1 and 2A-2C.

At operation 402, the credential manager determines whether a provisioning operation is required for provisioning of a MCED. If the determination in operation 402 is YES, the method advances to operation 404 where the credential manager generates MCED credentials for an MCED that is being provisioned (e.g., MCED provisioning process 250 of FIG. 2B).

The MCED credentials may include at least an identifier ID, a password, a password validity duration, and/or other settings and/or configuration information of the MCED being provisioned. At operation 406, the generated MCED credentials are stored in the credential repository by the credential manager.

The method may end following operation 406.

Alternatively, if the determination in operation 402 is NO, the method advances to operation 408 where the credential manager determines whether any MCED credentials stored in the credential repository is expired. An MCED credential expires when a password validity duration associated with the password generated for an MCED expires, resulting in the current password generated for (associated with) the MCED to become no longer valid.

If the determination in operation 408 is YES, then the method advances to operation 410 where one or more credential update actions (e.g., MCED validation process 270 of FIG. 2B) are executed (performed) by the credential manager.

The credential update actions include generating updated MCED credentials for the MCED associated with the expired credentials. The updated MCED credentials include a new password and a new password validity duration for the MCED. Once generated, the credential manager stores the updated MCED credentials in the credential repository and removes (e.g., deletes) the corresponding expired credentials from the credential repository. The method may end following operation 410.

Alternatively, if the determination in operation 408 is NO, the method advances to operation 412 where the credential manager determines whether any MCEDs are to be removed from the data processing system.

If the determination in operation 412 is NO, the method may end following operation 412. Alternatively, if the determination in operation is YES, the method proceeds to operation 414 where the credential manager executes (performs) one or more MCED removal policy actions (e.g., MCED validation process 270 of FIG. 2B) to remove an MCED.

Before an MCED is removed from a data processing system, the credential manager instructs the MCED to reset to MCED to its default settings and/or configurations as part of performing a graceful shutdown. The one or more MCED removal policy actions also include the credential manager removing the MCED credentials (of the MCED being removed) from the credential repository.

The method may end following operation 414.

Any of the components illustrated in FIGS. 1-2C may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-507 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/ logic 528 can be implemented in any combination hardware devices and software components.

Note that while system 500 is illustrated with various components of a data processing system, it is not intended to represent any particular architecture or manner of inter-connecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic repre-sentations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requir-ing physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic com-puting device, that manipulates and transforms data repre-sented as physical (electronic) quantities within the com-puter system's registers and memories into other data similarly represented as physical quantities within the com-puter system memories or registers or other such informa-tion storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the opera-tions described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing management controller enhanced devices (MCEDs) of a data processing system, the method comprising:

obtaining, by a guest processing complex of a MCED of the MCEDs, a secure encryption key (SEK) directly from a host management controller of the data process-ing system over a first communication channel, the host management controller being a host baseboard man-agement controller (BMC) of the data processing sys-tem;

obtaining, by a guest management controller of the MCED and from the guest processing complex, the SEK;

obtaining, by the guest management controller, a secured communication from the host management controller over a second communication channel;

decrypting, by the guest management controller, the secured communication using the SEK to obtain a message; and performing, by the guest management controller, at least one action based on the message.

2. The method of claim 1, wherein the first communica-tion channel is a secured communication channel and the second communication channel is an unsecured communi-cation channel.

3. The method of claim 2, wherein the first communica-tion channel is implemented using an inter-integrated com-munication (I2C) communication link and the second com-munication channel is implemented using at least one item selected from a group of items consisting of: a universal serial bus (USB), a peripheral component interconnect express (PCIe) Bus, a serial ATA (SATA) bus, and a serial peripheral interface (SPI) bus.

4. The method of claim 2, wherein the host management controller and the guest management controller are base-board management controllers and the guest processing complex is a field programmable gate array (FPGA).

5. The method of claim 1, further comprising:

managing, by a credential manager of the host manage-ment controller, a provisioning, validity, and removal of the MCEDs from the data processing system, wherein the credential manager is coupled to a credential repository configured in the host management control-ler.

6. The method of claim 5, wherein managing the provisioning, validity, and removal of the MCEDs comprises:

generating a password for the MCED in response to determining that the MCED is being provisioned in the data processing system;

setting a password validity duration for the password; and storing the password and information specifying the password validity duration in the credential repository, and the message comprises the password.

7. The method of claim 6, wherein managing the provisioning, validity, and removal of the MCEDs further comprises:

making a first determination that the password validity duration of the password has expired;

in response to the first determination, generating a new password and setting a new password validity duration for the MCED; and updating the credential repository with the new password and the new password validity duration.

8. The method of claim 6, wherein managing the provisioning, validity, and removal of the MCEDs further comprises:

making a second determination that the MCED is being removed from the data processing system; and in response to the second determination, causing execution of one or more MCED removal policy actions to facilitate graceful removal of the MCED from the data processing system.

9. The method of claim 8, wherein the one or more MCED removal policy actions comprise:

generating MCED removal instructions to cause the MCED to reset to default device configurations before being physically or operably removed from the data processing system; and deleting the password and the information specifying the password validity duration from the credential repository to place the MCED in a state conducive to provisioning with another data processing system.

10. The method of claim 9, wherein the one or more MCED removal policy actions further comprise:

transmitting the MCED removal instructions to the guest processing complex via a second secured communication over the second communication channel, wherein the guest processing complex decrypts the second secured communication using the SEK stored in the guest management controller.

11. A non-transitory machine-readable medium having instructions stored therein, which when executed by a processor, cause a device to perform operations for managing management controller enhanced devices (MCEDs) of a data processing system, the operations comprising:

obtaining, by a guest processing complex of a MCED of the MCEDs, a secure encryption key (SEK) directly from a host management controller over a first communication channel, the host management controller being a host baseboard management controller (BMC) of the data processing system;

obtaining, by a guest management controller of the MCED and from the guest processing complex, the SEK;

obtaining, by the guest management controller, a secured communication from the host management controller over a second communication channel;

decrypting, by the guest management controller, the secured communication using the SEK to obtain a message; and performing, by the guest management controller, at least one action based on the message.

12. The non-transitory machine-readable medium of claim 11, wherein the first communication channel is a secured communication channel and the second communication channel is an unsecured communication channel.

13. The non-transitory machine-readable medium of claim 12, wherein the first communication channel is implemented using an inter-integrated communication (I2C) communication link and the second communication channel is implemented using at least one item selected from a group of items consisting of: a universal serial bus (USB), a peripheral component interconnect express (PCIe) Bus, a serial ATA (SATA) bus, and a serial peripheral interface (SPI) bus.

14. The non-transitory machine-readable medium of claim 12, wherein the host management controller and the guest management controller are baseboard management controllers and the guest processing complex is a field programmable gate array (FPGA).

15. The non-transitory machine-readable medium of claim 11, wherein the operations further comprise:

managing, by a credential manager of the host management controller, a provisioning, validity, and removal of the MCEDs from the data processing system.

16. A data processing system, comprising:

a management controller enhanced device (MCED) comprising a guest management controller and a guest processing complex;

a host management controller;

a processor coupled to a memory that store instructions, which when executed by the processor, cause the processor to perform operations for managing the MCED, the operations comprising:

obtaining, by a guest processing complex of the MCED, a secure encryption key (SEK) directly from a host management controller over a first communication channel, the host management controller being a host baseboard management controller (BMC) of the data processing system;

obtaining, by a guest management controller of the MCED and from the guest processing complex, the SEK;

obtaining, by the guest management controller, a secured communication from the host management controller over a second communication channel;

decrypting, by the guest management controller, the secured communication using the SEK to obtain a message; and performing, by the guest management controller, at least one action based on the message.

17. The system of claim 16, wherein the first communication channel is a secured communication channel and the second communication channel is an unsecured communication channel.

18. The system of claim 17, wherein the first communication channel is implemented using an inter-integrated communication (I2C) communication link and the second communication channel is implemented using at least one item selected from a group of items consisting of: a universal serial bus (USB), a peripheral component interconnect express (PCIe) Bus, a serial ATA (SATA) bus, and a serial peripheral interface (SPI) bus.

19

20

19. The system of claim 18, wherein the host management controller and the guest management controller are baseboard management controllers and the guest processing complex is a field programmable gate array (FPGA).

20. The system of claim 16, wherein the operations further comprise:

managing, by a credential manager of the host management controller, a provisioning, validity, and removal of the MCED from the data processing system, wherein the credential manager is coupled to a credential repository configured in the host management controller, and wherein the host management controller is separate and distinct from a processor of the data processing system.

* * * * *